United States Patent [19]
Dennison et al.

[11] 3,895,873
[45] July 22, 1975

[54] SPECTROSCOPIC ANALYSIS APPARATUS UTILIZING A TUBULAR HEATING ELEMENT AND A PASSIVE SAMPLE HOLDER

[75] Inventors: Allan G. Dennison, Acton, Mass.; Martha F. Bancroft, Amherst, N.H.; Stanley B. Smith, Jr., Westford; Marc Joshua Tolkoff, Boston, both of Mass.

[73] Assignee: Instrumentation Laboratory, Inc., Lexington, Mass.

[22] Filed: Apr. 4, 1974

[21] Appl. No.: 457,798

[52] U.S. Cl. .................................. 356/85; 356/244
[51] Int. Cl. ............................................. G01j 3/02
[58] Field of Search ..................... 356/85, 244, 246

[56] References Cited
UNITED STATES PATENTS
3,824,016  7/1974  Woodriff et al. ..................... 356/85

OTHER PUBLICATIONS
Woodriff et al.; Applied Optics, Vol. 7, No. 7, July 1968, pp. 1337–1339.

Primary Examiner—Ronald J. Stern
Assistant Examiner—F. L. Evans

[57] ABSTRACT

Spectroscopic analysis apparatus utilizes a tubular electrothermal heating element and a passive sample holder. The sample holder is insertable through an access opening in the heating element to rest in intimate heat transfer contact with an interior surface, and includes a portion which restricts vapor flow through the access opening.

19 Claims, 5 Drawing Figures

PATENTED JUL 22 1975　　3,895,873

SHEET 1

PATENTED JUL 22 1975  3,895,873

SHEET 2

SPECTROSCOPIC ANALYSIS APPARATUS UTILIZING A TUBULAR HEATING ELEMENT AND A PASSIVE SAMPLE HOLDER

SUMMARY OF INVENTION

This invention relates to apparatus for spectroscopic analysis, and more particularly to apparatus for flameless excitation of a sample to an atomic state suitable for analysis.

Spectroscopic analysis is a useful technique for detecting and measuring small quantities of substances of interest in a sample material; in some cases it is the only practical means available to perform a measurement. A spectroscopic system of the type to which the invention relates includes a radiation source that provides a beam in the spectral range of interest, means to excite the sample material to a higher atomic state, and a detector which measures the intensity of the radiation after the beam has passed through the excited sample medium. Depending on the desired measurement, the radiation beam may be transmitted in various portions of the spectrum including visible, infrared, or ultraviolet ranges.

Several techniques, such as direct and alternating current arcs and high voltage discharge sparks, have been used to atomically excite the sample. For solid and liquid sample materials, atomic excitation has been achieved by high temperature (i.e., up to about 3,500°C.) heating devices, both of the flame and the flameless variety. Flameless heating has generally been found to have certain advantages. In one type of heretofore known flameless devices, a tubular heating element is employed and it is an object to provide an improved sample excitation system of that type. In prior flameless devices that employ tubular elements difficulties have been encountered, for example, in placing sample material to be analyzed in the heating element, in cross-contamination between successive samples, and in the time required for processing sequences. Where direct thermal contact between the sample and the active heating element is employed, the sample may reach an excited atomic state before the surrounding environment is heated to temperature sufficient to adequately sustain the material in such state. The preprocessing of samples, for example to initially remove moisture that would otherwise interfere with the spectroscopic measurement has frequently been difficult or has unduly extended the processing sequence. Sample containment has also been a problem, for example, a sample placed directly on a surface of the excitation source may flow away from its initial location and result in non-uniform heating and introduction into the radiation beam, as well as creating cleaning problems.

In view of these and other aspects of the prior art, it is a principal object of the present invention to provide novel and improved apparatus for spectroscopic analysis. Another object is the provision of novel and improved spectroscopy apparatus that facilitates the handling of sample materials and the preparation thereof prior to excitation. A further object is the provision of novel and improved spectroscopy apparatus of the flameless excitation type in which improved coordination of sample heating and heating of the environment in which the sample is located may be obtained. Other objects include the provision of a flameless excitation spectroanalysis system of improved sensitivity and precision; and a system in which deleterious effects of unusual sample matrices are lessened. In the accomplishment of these and further objects, the present invention provides a spectroscopic system having a tubular heating element positioned between a radiation beam source and a radiation detector. The longitudinal axis of the tubular heater is aligned with the beam so that at least a substantial portion of the beam passes through the tubular heater. This tubular heater has an interior support surface and an access opening aligned with the support surface. A heat conductive sample holder is insertable into the heating element through the access opening, to rest in intimate heat transfer contact with the interior support surface. The tubular heater is energized by electric current from an appropriate power supply to heat the support surface which in turn heats the sample holder resting thereon, to heat the sample to an excited atomic state. A blocking portion preferably is employed to restrict escape of excited sample through the access opening and to maintain substantial integrity of the analysis environment.

In preferred embodiments, the heating element is a tubular member having a sample excitation region of uniform cross-sectional configuration along its length through which the radiation analysis beam is passed. The top and bottom walls of the tubular member are closed at the sample excitation region, and the access opening is in the side wall of the tubular member at the sample excitation region. Terminal structure is connected to the tubular member on either side of the sample excitation region for supplying a large electrical current flow through said member to provide $I^2R$ heating at the sample excitation region to provide sample excitation temperatures up to about 3500°C. Each terminal structure is in electrical contact with the perimeter of the tubular member.

In a particular embodiment the tubular heater is a graphite tube coated with tungsten and has a flat interior support surface. The sample holder is a slab of graphite with a recess in its upper surface for receiving the sample. The holder is insertable through an access opening in the side wall of the graphite tube, and the recess is dimensioned to overlie substantially the entire width of the support surface when in place. The walls of the tubular heater and the sample holder are each less than one millimeter in thickness. The heating element is supported within a controlled environment housing by terminal structures, each of which includes electrically conductive inner clamping structure in clamping contact with the perimeter of the heating element, electrically conductive outer clamping structure of greater thermal resistance than the inner clamping structure and support structure for electrically connecting the clamping structures to a power supply.

Among the advantages of spectral analysis systems in accordance with the invention are increased retention of atomic vapor, adding precision to peak area measurements and minimizing loss of signal in slow output mechanisms; reduction of temperature gradients to which the atomic vapor is exposed; and enhanced sensitivity through reduction of externally radiated energy. The sample holders enable rapid batch processing; facilitate the analysis of different matrices; reduce memory effects; and enhance precision by more accurate sample placement and better control of sample pretreatment steps. Further, the materials of the sample heater and the sample holder may be varied as a function of the analytical problem, for example a metal heater and/or holder may be used where carbide interferences affect the sensitivity of the desired analysis.

Additional objects, features, and advantages of the invention will be seen from the following detailed description of a particular embodiment, in conjunction with the drawings in which.

DESCRIPTION OF PARTICULAR EMBODIMENT

Figure 1:
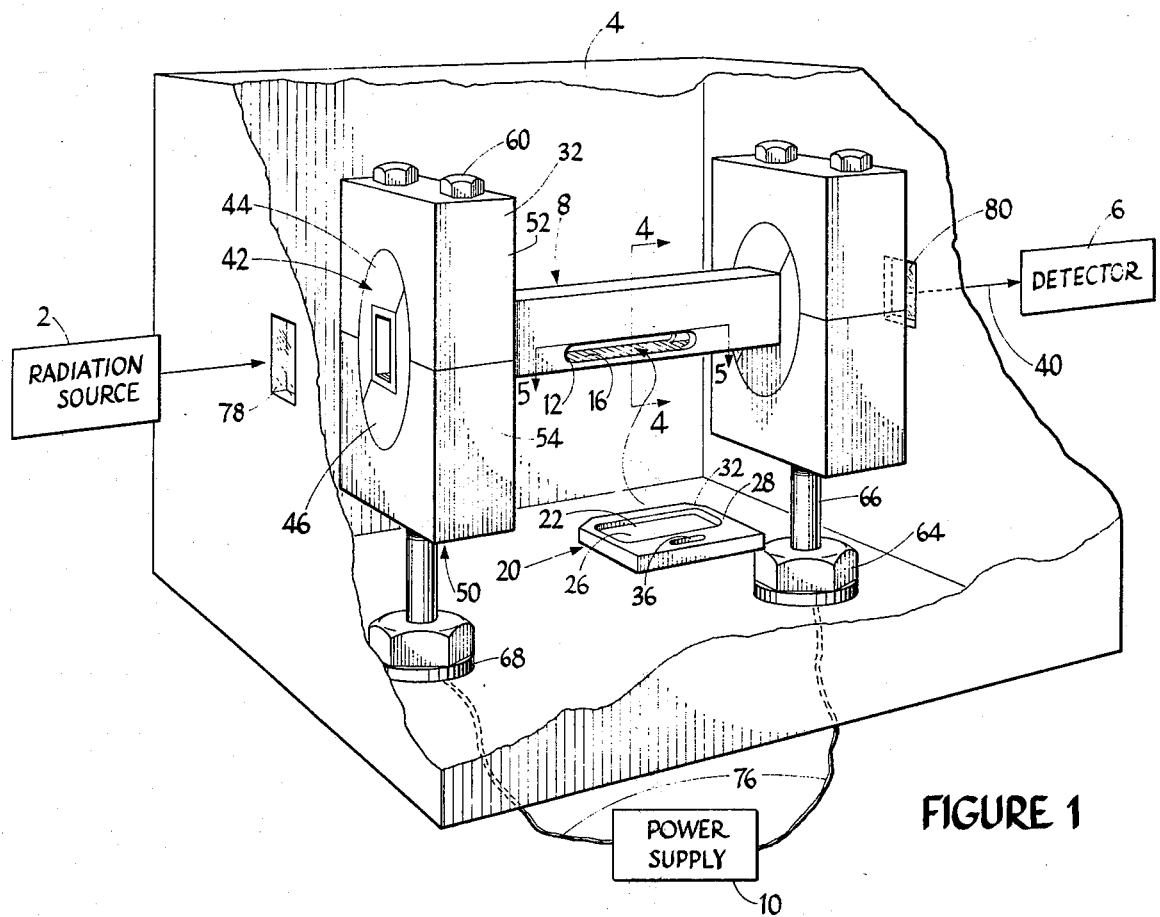
FIG. 1 is a somewhat diagrammatic, partially cutaway view in perspective of a spectroscopic system constructed in accordance with the invention.

Referring to the drawings, a spectroscopic analysis system is shown which includes a suitable radiation source 2, such as a hollow cathode tube, that emits a radiation beam including at least one wavelength which is absorbed by a material of interest. The beam is directed through a sample area disposed in a suitable environment, for example an inert gas, in water-cooled aluminum housing diagrammatically indicated at 4 to a detector 6, which for example may employ a monochromator set to the atomic absorption spectral wavelength of interest. The detector 6 produces an output as a function of the absorption of the beam at this characteristic wavelength.

The sample excitation apparatus includes an open-ended, tubular heating element 8 of uniform cross sectional configuration along its length, and a power supply 10 which is connected to flow electric current through the heating element 8 to heat it to an elevated temperature sufficient to excite a sample to a higher atomic state. The heating element 8 in this embodiment is a tube of ultradense spectrographic grade graphite about four centimeters long and square in cross-section, each side of the square measuring about two-thirds centimeter along the outside, with graphite walls about one-third millimeter thick. A thin layer 10 of tungsten, deposited on the exterior wall surfaces to a thickness of about 0.0005 inch to 0.001 inch, reduces the thermal emissivity of heater 8. Heater 8 may be of other electrothermal material such as tungsten or tantalum.

Access to the interior of the heating element 8 is provided by an elongated slot 12 about one centimeter long and one and one-half millimeter high formed in one of the heating element side walls 14 midway between the ends of the element, the bottom wall of slot 12 being aligned with the flat interior floor 16 of the heater. A second slot 18 (FIG. 4) is optionally formed in the opposed side wall of the heating element aligned with slot 12, the bottom wall of slot 18 also being aligned with the interior heating element floor 16. Slot 18 is of the same height and length as slot 12 at the inside of the heating element with its end walls tapered so that a shorter slot length is provided at the outside of the heating element.

Figure 4:
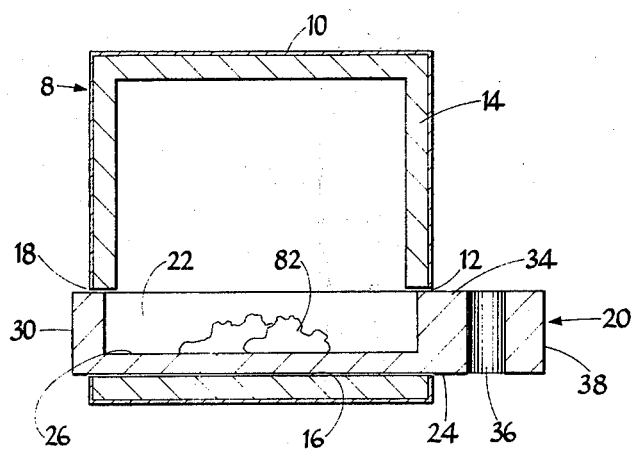
FIG. 4 is a sectional view taken along the line 4—4 of FIG. 1, showing a sample holder in operative position in the heating element; and, FIG. 5 is a sectional view taken along line 5—5 of FIG. 1, also showing a sample holder in operative position in the heating element.
Figure 2:
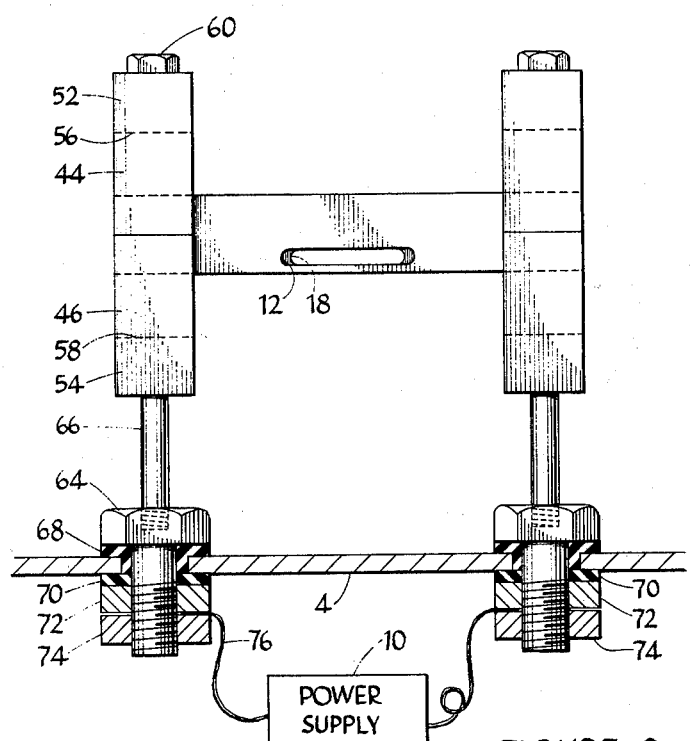
FIG. 2 is a front elevation view of a heating element and associated mounting structure employed in the system.
Figure 3:
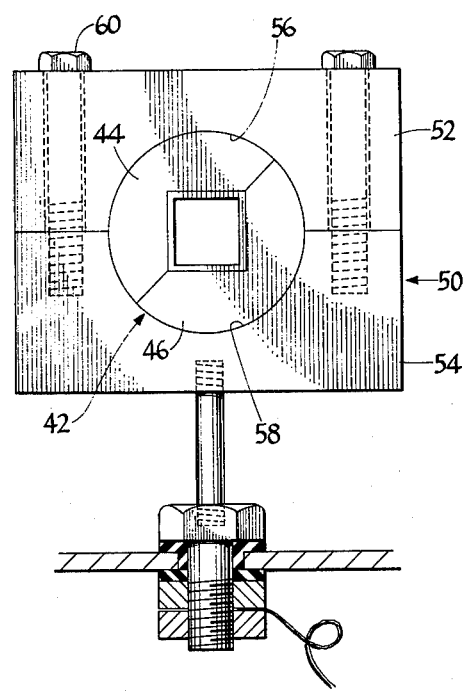
FIG. 3 is a side elevation view of the apparatus shown in FIG. 2.
Figure 5:
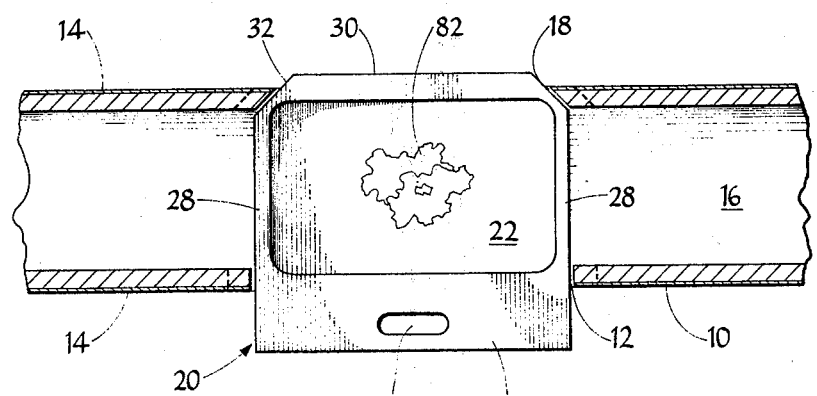

The sample holder 20 is a slab-like member formed from a suitable heat conductive material such as graphite, tungsten or tantalum that has a generally rectangular recess 22 in the forward portion. Holder 20 is slightly smaller in cross-section than the slot 12, allowing it to be slid through the slot with its bottom surface 24 resting in intimate contact with the heating element floor 16. The front to rear dimension of recess 22 is about one-half centimeter thereby extending across the entire width of the heating element floor when the member 20 is inserted through slot 12 as indicated in FIGS. 4 and 5. The floor 26 and side walls 28 of member 20 are each about one-third millimeter thick. The forward end 30 of the sample holding member 20 lodges in slot 18 when fully inserted into the heating element, as shown in FIGS. 4 and 5, the forward corners 32 of the member 20 having a 45° bevel to assist in guiding the member into the tapered slot 18. The rearward portion 34 of member 20 is a block of material which occupies nearly the entire area of slot 12 when the member 20 is in place, and thereby substantially seals the slot 12 to restrict the escape of excited sample material through the slot. Similarly, recess 22 is set back slightly from the forward edge of member 20, leaving a front wall 30 at the forward end of the member 20 that forms a forward boundary for the recess 22 and substantially seals slot 18. Also provided in the rearward portion 34 of sample holding member 20 is a vertical manipulating slot 36 that is adapted to receive a grasping tool to facilitate manipulation of the member 20 and insertion into and removal from the heating element 8. The sample holding member 20 may be engaged by a handling instrument (not shown) having a finger that is inserted into the slot 36 and a clamp that is spring driven against the rear edge 38 of the member 20 to hold the finger in place, the clamp being movable by the operator when it is desired to release the handling tool from the sample holder.

The tubular heating element 8 is mounted inside housing 4 with its longitudinal axis aligned with the radiation beam 40 so that at least a substantial portion of the beam passes through its interior. Identical mounting structures are provided at each end of the tube. Each mounting structure includes an inner clamping disc or collar 42, formed of a suitable electrically conductive material that has mechanical strength at elevated temperatures, such as graphite, that is divided into two sections 44 and 46 with a rectangular opening broached into each collar to accommodate the perimeter of the heating element. The inner collar sections are held together, clamping the heating element in place by an outer, rectangular collar structure 50 that is formed from an electrically conductive material of greater thermal resistance than graphite such as molybdenum. Collar 50 is divided into upper and lower halves 52 and 54. Semicircular openings 56 and 58 are formed in each collar half, between which the inner collar 42 is clamped when the outer collar halves 52 and 54 are brought together. A pair of bolts 60 are inserted through vertical bores in the upper collar half 52 on either side of opening 56 and engage the lower collar half 54 to hold the two pieces firmly together. The inner and outer collars 42 and 50 are each about one-half centimeters thick, the inner collar 42 being about one and one-half centimeters in diameter and the outer collar 50 being about two centimeters high and three centimeters wide. The inner collar openings are matched with the heating element 8 so that a substantially continuous contact is established between the inner collars 42 and the heating element 8 around the entire perimeter of the latter, and the outer collar opening are matched with the inner collar 42 to establish a substantially continuous contact with the perimeter of the inner collar 42 when the collars are clamped.

The mounting structure at each end of the heating element 8 further includes a copper bolt 64 that extends through the housing 4 and is rigidly attached to a molybdenum stand-off stud 66, which in turn is screwed into the bottom of outer clamping collar 50. The heating element 8 is spaced about two centimeters from the bottom wall of housing 4. An electrically insulative bushing 68 is interposed between the housing 4 and the bolt 64. A washer-like flange 70 which abuts the lower surface of housing 4, cooperates with the nut 72 to hold the bolt 64 firmly in place. A second nut 74 clamps an electrical lead 76 from power supply 10 against nut 72.

A pair of windows 78 and 80 are formed on opposite sides of the housing 4 in alignment with the radiation source 2 and detector 6 to enable the transmission of a beam through the heating element 8 along axis 40. Suitable means are also included for opening the housing 4 between analyses so that a sample can be removed and replaced with a new sample on the same or a different sample holding member 20 and for placing a suitable analysis environment in the chamber 4.

In operation, a sample holder 20 with a prepared sample 82 in recess 22 is introduced into the heating element through slot 12, the bottom support wall 24 of the sample holder 20 sliding along the floor 16 of the heating element until the forward wall 30 guides into and lodges in slot 18 on the far side of the heating element. With the sample holder in place, the slot 12 is substantially sealed by the rear extension portion 34, and the recess 22 extends over the entire width of the heating element floor 16. The housing 4 is closed, and pressurized if desired, although the system is normally operated with an appropriate purge gas at atmospheric pressure.

Application of electrical power to the terminal structure causes electric current to flow through and heat the walls of the heating element 8 to a steady state temperature up to 3,500°C. and to heat the atmosphere inside the heating element to a similar temperature. The sample material is heated principally by heat conducted from the heating element floor 16 through the bottom wall 26 of the sample holder. Consequently, there is a short lag in heating of the sample, resulting from the time required by the bottom wall 26 to be heated. During this lag time the atmosphere inside the heating element 8 is heated to a temperature sufficient to support the atomic state of the excited sample material 82. The radiation source 2 transmits a spectral analysis beam longitudinally through the excited vapor along axis 40 in heating element 8 to the detector 6. After analysis is completed, the housing is opened and the sample holder removed, leaving the system immediately ready to accept a holder containing the next sample to be analyzed.

In addition to the convenience with which samples can be handled, the employment of passive sample holders separate from the heating element facilitates rapid batch processing of a large number of samples. Each sample can be placed in its own holder and dried ahead of time. The samples can then be rapidly analyzed one after the other with full heating commencing as soon as each sample holder is inserted into the heating element, avoiding the drying of each sample inside the heating element in a preliminary slow heating step and subsequent dispelling of the evaporated solvents before excitation heating commences.

While a particular embodiment of the invention has been shown and described, modifications thereof will be apparent to those skilled in the art. For example, the bottom sample holder wall 26 and the heating element floor 16 do not have to be flat, and may assume other shapes that are substantially congruous and provide intimate heat transfer contact when the sample holder is inserted into the heating element. The position at the access opening in the heating element for the sample holder may be varied, while maintaining adequate heat transfer relation and containment of the sample material within the heating element. The apparatus is also adaptable for use in other spectroanalysis systems, such as atomic emission analysis. Therefore, it is not intended that the invention be limited to the disclosed embodiment or to the details thereof, and departures may be made therefrom within the spirit and scope of the invention as defined in the claims.

What is claimed is:

1. In a spectroscopic system for determining the quantity of a substance of interest in a sample material, said system including a radiation source for transmitting a radiation beam at a characteristic wavelength through a sample location, and a radiation detector for sensing said beam after transit through the sample location, sample excitation structure comprising:

a tubular heating element positioned at said sample location, said heating element having a longitudinal axis aligned with said radiation beam, the ends of said heating element being transparent to said beam, an access opening in a longitudinal wall of said heating element, and a heating surface adjacent said access opening, a sample holder insertable into said heating element through said access opening, said sample holder including a sample receiving surface for receiving sample material and a heat transmitting surface that nests in intimate heat transfer contact with said heating surface of said heating element when the holder is inserted into said heating element, and structure for applying an energizing signal to said heating element of sufficient intensity to generate heat for conductive transmission from said heating surface through the nested heat transmitting surface of said sample holder to excite said sample material on said sample receiving surface to an atomic state.

2. The apparatus of claim 1 and further including seal structure formed integrally with said sample holder, said seal structure being adapted to lodge in said access opening and occupy substantially the entire cross-section area thereof when said holder is inserted into said element, thereby restricting escape of sample material in the atomic state from said heating element through said access opening.

3. The apparatus of claim 1 wherein the bottom surface of said sample support wall and the bottom interior surface of said heating element are substantially flat, said access opening has a flat bottom wall formed co-extensively with the bottom interior surface of said heating element, thereby enabling said sample holder to be positioned within said heating element in intimate heat transfer contact therewith by being slid through said access opening with the bottom surface of said support wall in continuous contact with the bottom interior surface of said heating element.

4. The apparatus of claim 1 and further including a guide surface for said sample holder on the opposite longitudinal wall of said heating element from said access opening and aligned therewith, said sample holder being adapted to engage said guide surface during insertion into the heating element, to thereby aid in the positive positioning of said sample holder on said heating surface.

5. The apparatus of claim 1 wherein said energizing signal applying structure includes terminal structure at each end of said heating element, each said terminal structure comprising an inner member formed from an electrically conductive material, an outer member formed from an electrically conductive material of greater thermal resistance than said inner member, and an electrically conductive mounting support for said outer member, said inner member being in electrical contact with at least a substantial portion of the perimeter of said heating element, and said outer member being in electrical contact with at least a substantial portion of the perimeter of said inner member.

6. The apparatus of claim 1 and further including a thermally insulative housing enclosing said heating element, said housing including windows enabling the transmission of said radiation beam through said heating element, a pair of electrically conductive support structures mounting said element in said housing and wherein said energizing signal applying structure includes electrical conductors connected to said support structures.

7. Apparatus for heating a sample material to an atomic state suitable for spectroscopic analysis, comprising:
   a tubular heating element, at least the bottom wall of which is formed from an electrothermal material, said tubular element being transparent to a radiation beam transmitted along its longitudinal axis, an access opening in one longitudinal wall of said heating element,
   a sample holder insertable into said heating element through said access opening, said sample holder including a heat transmitting portion adapted to overlie the bottom heating element wall in intimate heat transfer contact therewith, and a manipulating portion extending outwardly from said heat transmitting portion through said access opening when said heat transmitting portion is in intimate heat transfer contact with said bottom heating element wall, and
   means for transmitting an electrical energizing signal to heat the electrothermal material of said heating element, and thereby excite a sample material in said holder to an atomic state by heat conduction from the bottom wall of the heating element, through the said sample holder heat transmitting portion to the sample.

8. The apparatus of claim 7 wherein the entire tubular heating element is formed of electrothermal material.

9. The apparatus of claim 8 wherein said heating element comprises a graphite tube and a thin layer of another material on the exterior surface of said graphite tube of sufficient thickness to reduce the thermal emissivity of said heating element to a level significantly less than the thermal emissivity of graphite.

10. The apparatus of claim 9 wherein said sample holder has a recess in its upper surface for holding a sample, said heat transmitting portion includes a planar portion below said recess, said heating element includes a bottom wall that has a planar interior surface, said access opening is formed in a side wall of said heating element, and the base of said access opening is aligned with said planar interior surface of said heating element.

11. The apparatus of claim 10 wherein said recess is formed in a forward portion of said sample holder, the front-to-rear dimension of said recess corresponding to the width between the side walls of said heating element, the rearward portion of said sample holder corresponding in cross-sectional dimension to said access opening so as to seal said access opening when said sample holder is inserted into said heating element through said opening.

12. The apparatus of claim 11 wherein said sample holder is formed from graphite, and the thickness of said heat transmitting portion and the walls of said heating element is less than one millimeter.

13. Spectroanalysis cell apparatus comprising a tubular member having a sample excitation region of uniform cross-sectional configuration along its length through which a radiation analysis beam may be passed, the top and bottom walls of said member being closed at said sample excitation region an access opening in the side wall of said member at said sample excitation region, and said member having a sample holder receiving surface aligned with said opening,
   terminal structure connected to said tubular member on opposite sides of said sample excitation region for supplying electrical current for flow through said member to provide $I^2R$ heating of said sample holder receiving surface,
   and a sample holder insertable into said sample through said access opening for positioning on said sample holder receiving surface, said sample holder having a surface that mates congruently in intimate heat transfer contact with said sample holder receiving surface, and a manipulating portion that extends outwardly from said tubular member when said sample holder is disposed on said sample holder receiving surface, heat from said sample holder receiving surface being transmitted by conduction to said mating sample holder to excite sample material on said sample holder to an atomic state for analysis.

14. The apparatus of claim 13 wherein said sample holder receiving surface is planar.

15. The apparatus of claim 13 wherein each said terminal structure is in electrical contact with the entire perimeter of said tubular member.

16. The apparatus of claim 13 wherein said tubular member comprises a base tube of one material and a thin layer of another material on the external surface of said base tube, said this layer reducing the thermal emissivity of said tubular member to a level significantly less than the thermal emissivity of said base tube.

17. The apparatus of claim 16 wherein said base tube is graphite and said thin layer is a metal.

18. The apparatus of claim 13 wherein said manipulating portion has dimensions corresponding to the dimensions of said access opening so that said manipulating portion restricts escape of excited sample material from said tubular member through said access opening when said sample holder is positioned on said sample holder receiving surface.

19. The apparatus of claim 13 wherein said sample holder includes a recess for receiving sample material, said recess being directly above said mating surface.

* * * * *